United States Patent
Beauvilain et al.

(10) Patent No.: US 10,255,012 B2
(45) Date of Patent: Apr. 9, 2019

(54) ROLL-FED PRINTING ASSEMBLY, SOFTWARE MEDIUM, AND METHOD FOR CONTROLLING A ROLL-FED PRINTING ASSEMBLY

(71) Applicant: Océ Holding B.V., Venlo (NL)

(72) Inventors: Amélie Beauvilain, Crétail (FR); Hélène Bernadette Elisabeth Danlos, Paris (FR); Mircea Nistor, Timisoara (RO); Bastiaan J. Hermus, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 16/006,529

(22) Filed: Jun. 12, 2018

(65) Prior Publication Data

US 2018/0357026 A1    Dec. 13, 2018

(30) Foreign Application Priority Data

Jun. 13, 2017  (EP) .................................... 17175723

(51) Int. Cl.
*G06F 3/12* (2006.01)
*H04N 1/00* (2006.01)
(Continued)

(52) U.S. Cl.
CPC .......... *G06F 3/1262* (2013.01); *G06F 3/1207* (2013.01); *G06F 3/1235* (2013.01);
(Continued)

(58) Field of Classification Search
None
See application file for complete search history.

(56) References Cited

U.S. PATENT DOCUMENTS 6,813,038 B1 * 11/2004 Kadowaki ............. G06F 3/1217
358/1.1
8,641,305 B2 * 2/2014 Yasuzaki ................ B41J 3/60
347/104
(Continued)

FOREIGN PATENT DOCUMENTS

JP   2009-80791 A   4/2009
JP   2011-62954 A   3/2011

OTHER PUBLICATIONS

Search Report issued in European priority application 17175723.0 dated Nov. 13, 2017.

*Primary Examiner* — Dung D Tran
(74) *Attorney, Agent, or Firm* — Birch, Stewart, Kolasch & Birch, LLP

(57) ABSTRACT

A roll-fed printing assembly, a software medium, and a method of controlling a roll-fed printing assembly are disclosed. The method includes: controlling the printing to execute a first print job containing a batch of nested individual jobs; detecting a pause state during the executing of the first print job; stopping the executing of the first print job in response to the detecting of the pause state; determining, for each individual job of the first print job, whether that individual job belongs to either: a first group of individual jobs that have already been printed successfully, or to a second group of individual jobs that have not yet been printed successfully; creating a second print job by automatic re-nesting of the jobs of the second group based on a nesting criterion; and controlling the printing assembly to execute the second print job.

15 Claims, 3 Drawing Sheets

(51) Int. Cl.
*G06K 15/02* (2006.01)
*G06K 15/00* (2006.01)

(52) U.S. Cl.
CPC .......... *G06F 3/1259* (2013.01); *G06F 3/1296* (2013.01); *G06K 15/1868* (2013.01); *G06K 15/1893* (2013.01); *G06K 15/408* (2013.01); *G06K 15/4085* (2013.01); *H04N 1/00652* (2013.01)

(56) References Cited

U.S. PATENT DOCUMENTS

| | | | |
|---|---|---|---|
| 8,810,849 B2* | 8/2014 | Matsuhashi | B41J 3/4075 |
| | | | 358/1.1 |
| 9,417,829 B2* | 8/2016 | Sheldon | G06Q 10/0631 |
| 9,904,877 B2* | 2/2018 | Yoshiwaka | G06K 15/16 |
| 2009/0322808 A1 | 12/2009 | Mitchell et al. | |
| 2011/0069329 A1* | 3/2011 | Abe | G06F 3/1219 |
| | | | 358/1.9 |
| 2012/0081726 A1* | 4/2012 | Nakamaru | G06K 15/022 |
| | | | 358/1.12 |
| 2013/0286410 A1* | 10/2013 | Yasinover | H04N 1/387 |
| | | | 358/1.2 |
| 2015/0147073 A1* | 5/2015 | Nonaka | G03G 15/502 |
| | | | 399/21 |
| 2015/0170011 A1* | 6/2015 | Hattori | G06K 15/408 |
| | | | 358/1.6 |
| 2015/0347060 A1* | 12/2015 | Honda | G06F 3/121 |
| | | | 358/1.14 |
| 2016/0231966 A1* | 8/2016 | Ujike | G06K 15/186 |
| 2018/0217793 A1* | 8/2018 | Kamijima | G06F 3/1229 |
| 2018/0232184 A1* | 8/2018 | Iacob | B41J 3/28 |

* cited by examiner

ROLL-FED PRINTING ASSEMBLY, SOFTWARE MEDIUM, AND METHOD FOR CONTROLLING A ROLL-FED PRINTING ASSEMBLY

FIELD OF THE INVENTION

The present invention generally pertains to a roll-fed printing assembly, such as a roll-to-roll inkjet printing assembly, for printing images on a recording medium such as paper. The invention also pertains to a software medium comprising executable code configured to, when executed, perform a method for controlling a roll-fed printing assembly. The invention also pertains to a method for controlling a roll-fed printing assembly, such as a roll-to-roll inkjet printing assembly, for printing images on a recording medium such as paper.

BACKGROUND ART

Roll-fed printers are a well-known type of printers. In roll-fed printers, a recording medium such as paper is wound up on an input roll and then fed into, and guided along, a path through the printer, unwinding the input roll by and by along the process. In this way, the recording medium is roll-fed (i.e. taken from a roll and fed) to a marking unit of the printer which applies a marking material (prints) onto the recording medium Roll-to-roll printers are a common type of roll-fed printers and are characterized in that the recording medium is, after images have been printed on it, wound up on an output holder of an output roll by and by along the process.

Somme roll-fed printers comprise a cutting unit configured to cut the recording medium after images have been printed on it such that the printer does not output the entire contiguous recording medium but instead cut pieces of it.

Roll-fed printers are very efficient devices for forming a large number of images requiring a large amount of the recording medium, as the wound-up input rolls are comparatively easy to handle by both the printers and their operating personnel. Accordingly, little or no supervision by personnel is needed for roll-fed printers, especially for roll-to-roll printers, as the marked recording medium is automatically stored on the output roll.

To utilize as much of the recording medium as possible, a technique called "nesting" is commonly employed. Nesting comprises taking a plurality of individual print jobs and arranging them such in a single, larger print job comprising all of the individual print jobs. Nesting may be performed in one single direction, or in two directions. In this way, multiple individual jobs may be arranged side-by-side in a direction perpendicular to the direction the recording medium is moving along the path.

In addition, gaps left by e.g. some larger individual jobs on the recording medium roll may be filled by one or more smaller individual jobs, thus reducing the amount of recording medium used for printing the larger and the smaller individual jobs compared to printing them one after the other along the recording medium roll. Nesting therefore contributes to reduce the amount of the recording medium needed by fully utilizing both the length of the recording medium (along the direction the recording medium is moving) and the breadth of the recording medium (perpendicular to that direction of moving). Nesting is usually done before the single print job comprising the individual nested jobs is converted to a bitmap (also called a bitmap image or a raster image).

When any problems arise during the printing of the recording medium, this may result in a considerable loss of resources such as time (because the printing process might be, or might have to be, stopped until a person can solve the problems) or recording medium and marking material (because a started print job might be irreparably botched and has to be started anew).

In US 2009/0322808 A1, a method is disclosed according to which a print job currently queued as next-in-line in a printing system is only executed if and when a current amount of remaining ink in the printing system is larger than an amount required to print that print job. If that is not the case, the same procedure is performed for the print job currently queued after that print job, and so on.

In US 2012/0081726 A1, an image processing assembly is described with a print restart region that determines, upon detection of an occurrence of an abnormality during the printing operation, a print restart region starting from which a job is then scheduled to be re-printed.

In JP 2011 062954 an image forming apparatus is described which discerns guaranteed pages of a printed job and non-guaranteed pages of a printed job when a failure occurs.

In US 2016/231966 nesting of print jobs is described for saving resources when printing the print jobs.

It is desirable to have a method for controlling a roll-fed printing assembly that makes optimum use of the available resources and requires little maintenance and supervision. It is also desirable to have a roll-fed printing assembly capable of executing such a method.

SUMMARY OF THE INVENTION

In a first aspect of the present invention, a method for controlling a roll-fed printing assembly for printing images on a recording medium is provided. The method comprises the steps of:

controlling the printing assembly to execute a first print job containing a batch of nested individual jobs;

detecting a pause state during the executing of the first print job;

stopping the executing of the first print job in response to the detecting of the pause state;

determining, for each individual job of the first print job, whether that individual job belongs to either:

a first group of individual jobs that have already been printed successfully when the executing of the first print job was stopped, or to a second group of individual jobs that have not yet been printed successfully when the executing of the first print job was stopped;

creating a second print job by automatic re-nesting of at least the jobs of the second group based on at least one nesting criterion; and controlling, in particular automatically controlling, the printing assembly to execute the second print job.

Preferably, the roll-fed printing assembly is a roll-to-roll inkjet printing assembly.

The term "printing" is used herein as a general term for any marking of a recording medium with any marking material. As a synonym, the term "image forming" may be used. Recording mediums may comprise paper, flexible plastic, metal foils, textiles and so on. Marking materials may comprise ink, metal, varnish, toner and so on. "Marking" may be any process by which the marking material is applied to the recording medium.

The term "pause state", as used herein, may refer to any state in which the normal executing of the first print job is to be paused, or halted, and may therefore also be termed as a "halt state". The pause state may be a state in which an operator, or a hardware or software device, has issued an order to pause. The pause state may also be an error state in which an error has occurred in any part of the printing process, or in the operation of the roll-fed printing assembly. The error state may be characterized in that an error signal has been transmitted by a (software or hardware) component of the roll-fed printing assembly, the error signal indicating that the error has occurred.

The term "successfully printed" may be synonymous with "completely printed". The term may, however, comprise additional criteria, for example the criterion that the individual job has been formed on the recording medium exactly as was intended by the data characterizing said individual job, e.g. all pixels of the bitmap characterizing that individual print job are exactly reproduced on the recording medium. Another possible criterion for a "successfully printed" individual job may be that the individual job has been printed exactly at the position of the recording medium intended for it. Depending on the used recording medium and the used marking material, an additional criterion for a "successfully printed" individual job may be that the individual job has been printed with a certain thickness on the recording medium, e.g. when an integrated circuit is printed in metal.

The described method has, among others, the advantage that the first print job may be stopped as soon as the pause state, in particular an error state, is detected such that a waste of recording medium is reduced to a minimum. Then, in the second print job, the individual jobs of the second group (i.e. the individual jobs not yet started, and the jobs affected by the pause state such that they were not successfully printed) are nested again to ensure, once more, optimal use of the recording medium from that point in time on.

When the second print job is finished, an operator of the roll-fed printing assembly has a guarantee that all individual jobs are printed successfully. Thus, a time-consuming inspection of all printed individual jobs may be omitted.

Additional advantages, and the solution of additional problems, will be apparent from the subject-matter of the dependent claims as well as from the description and the drawings.

In some advantageous embodiments, the determining whether each job of the first print job belongs to the first group or to the second group is performed by:
  determining at which stopping position, of a bitmap representing the first print job, the executing of the first print job was stopped;
  identifying which of the jobs of the first print job were not completely comprised in the section of the bitmap preceding the determined stopping position; and
  determining these identified jobs as belonging to the second group and the remaining jobs of the first print job as belonging to the first group.

Accordingly, in those embodiments, the criterion "successfully completed" may consist of the criterion "printed completely".

The stopping position may be characterized by an absolute value (e.g. x cm, or y pixels, from the start of the bitmap) or by a percentage value (e.g. z % of the bitmap length). The stopping position may be as precise as possible (e.g. an exact pixel position). In some embodiments, the stopping position may comprise a safety margin, for example ten pixels left and right of the originally determined stopping position. In this way, it is made even more certain that no affected individual job is wrongly judged as belonging to the first group.

In some advantageous embodiments, the stopping position is determined based on an automated optical inspection of at least a section of the recording medium downstream of a marking unit of the printing assembly. In this way, an efficient and reliable way of determining the stopping position is provided. The automated inspection may be performed by a camera or at least one captor and/or sensor. The camera may, e.g., be of the type RGB or RGB-D.

The term "marking unit" refers to a structure, a device, or a system, within the roll-fed printing assembly that performs the actual printing, i.e. the marking of the recording medium with the marking material. For example, the marking unit of an inkjet printing assembly is an inkjet print head.

"Downstream" herein, and in the following, is applicable to positions that are reached later by the recording medium moving along the intended path starting from an input roll of the roll-fed printing assembly than positions "upstream". For example, the marking unit (e.g. an inkjet print head of an inkjet printing assembly) is arranged downstream of the input roll.

In some advantageous embodiments, the determining whether each individual job of the first print job belongs to the first group or to the second group is performed using given predetermined cut path data comprising information about at least one cut path along which the recording medium is to be cut in order to separate the nested individual jobs of the first print job after their printing. In this way, already available resources are used to reliably separate the individual jobs into the first and the second group.

In some advantageous embodiments, the at least one nesting criterion comprises a criterion that the second print job shall be created such that as many of the individual jobs of the second print job are able to be printed before a specific resource is depleted to a certain amount or percentage. In this way, the undesired but factual interruption of the executing of the first print job may be utilized to re-evaluate the nesting of the individual jobs in the first print job based on the actual and current state of the printing assembly (rather than, say, a prediction made at the time of creating the first print job), thus possibly improving overall efficiency. The percentage is preferably zero such that the specific resource is optimally utilized.

In some advantageous embodiments, the method comprises controlling a component of the printing assembly arranged downstream of a marking unit of the printing assembly in accordance with the second print job. The controlled component may, e.g., by a cutting unit configured to cut the recording medium according to given cut paths. The controlled component may e.g. also be an optical device for carrying out an automatic optical inspection, and the controlling may comprise updating the bitmap that the optical device uses to carry out that inspection.

In some advantageous embodiments, the pause state is an error state detected based on an automated optical inspection of at least a section of the recording medium downstream of a marking unit of the roll-fed printing assembly (e.g. downstream of a print head of an inkjet printing assembly). The automated optical inspection may be performed by a camera or at least one captor and/or sensor. The camera may, e.g., be of the type RGB or RGB-D. The automated optical inspection may be also used for determining the stopping position, as has been described in the foregoing.

In some advantageous embodiments, the pause state is an error state detected based on a monitoring of at least one component of the printing assembly for mechanical failures. For example, the error state may indicate a nozzle failure of a marking unit of the printing assembly, such as a nozzle failure of a print head of an inkjet printing assembly. If the error state indicates an error that may be automatically fixed, the method may include a step of controlling the printing assembly to fix the error automatically, e.g. by switching to a back-up system not affected by the error.

According to a second aspect, a software medium is provided, the software medium comprising executable code configured to, when executed, perform the method of the first aspect or any of its variants or embodiments.

According to a third aspect, a roll-fed printing assembly for printing images on a recording medium is provided. The printing assembly comprises:

a pause detection system configured to detect a pause state during executing of a first print job containing a batch of nested individual jobs;

the pausing system being further configured to stop the executing of the first print job in response to the detecting of the pause state;

a workflow engine configured to determine, for each job of the batch of nested individual jobs, whether that individual job belongs to either:

a first group of individual jobs that have already been printed successfully when the executing of the first print job was stopped, or to a second group of individual jobs that have not yet been printed successfully when the executing of the first print job was stopped;

the workflow engine further configured to create a second print job by automatic re-nesting of at least the jobs of the second group based on at least one nesting criterion; and a printer controller configured to control the printing assembly to execute the second print job.

The roll-fed printing assembly may in some advantageous embodiments consist of, or essentially consist of, a single roll-fed printing apparatus. In other words, the roll-fed printing assembly may be formed with, and within, a single housing as one printing machine.

In other advantageous embodiments, the roll-fed printing assembly may be formed as an at least partially distributed system. In other words, some or all of the components described as part of the roll-fed printing assembly may either be provided in a housing that houses the marking unit of the roll-fed printing assembly, or may be provided as units or modules (realized by hardware and/or software) external to that housing. For example, the workflow engine may be realized as a software module run by e.g. a computer situated outside of the housing that houses the marking unit of the roll-fed printing assembly. Some or all of the components realized as software modules may be provided as part of, or as connected by, a remote server network, e.g. a server cloud. As an alternative, all of the components of the roll-fed printing assembly may be provided as local components.

In some advantageous embodiments, the workflow engine is configured such that the at least one nesting criterion comprises a criterion that the second print job shall be created such that as many of the individual jobs of the second print job as possible can be printed by the printing assembly before a specific resource is depleted to a certain amount or percentage, as described above for the method according to the first aspect.

In some advantageous embodiments, the printing assembly comprises an optical device arranged and configured for optically inspecting at least a section of the recording medium, preferably at least a section of the recording medium downstream of a marking unit of the roll-fed printing assembly (e.g. downstream of a print head of an inkjet printing assembly).

The optical device may further be configured to create an error signal indicating, as the pause state, an error state based on the optical inspecting. Additionally, or alternatively, the optical device may further be configured to create a position signal indicating a stopping position, or stopping percentage, of a bitmap representing the first print job, at which the executing of the first job has been stopped. The optical device may be implemented as a camera or at least one captor and/or sensor. The camera may, e.g., be of the type RGB or RGB-D.

In some advantageous embodiments, the roll-fed printing assembly comprises at least one failure detecting unit configured to detect a mechanical failure of a component of the printing assembly. The failure detecting unit is further configured to create an error signal indicating, as the pause state, an error state as a result of the mechanical failure. The failure detecting unit may be configured to detect a mechanical failure of a nozzle of a print head of an inkjet printing assembly (as the marking unit of the roll-fed printing assembly). By contrast, in a typical print shop, when a nozzle failure occurs the affected individual jobs are usually determined visually by the shop personnel, and are reprinted manually, affecting overall productivity and causing a loss of resources.

BRIEF DESCRIPTION OF THE DRAWINGS

The present invention will become more fully understood from the detailed description given hereinbelow and the accompanying schematic drawings which are given by way of illustration only, and thus are not limitative of the present invention, and wherein.

DETAILED DESCRIPTION OF THE DRAWINGS

Figure 1:
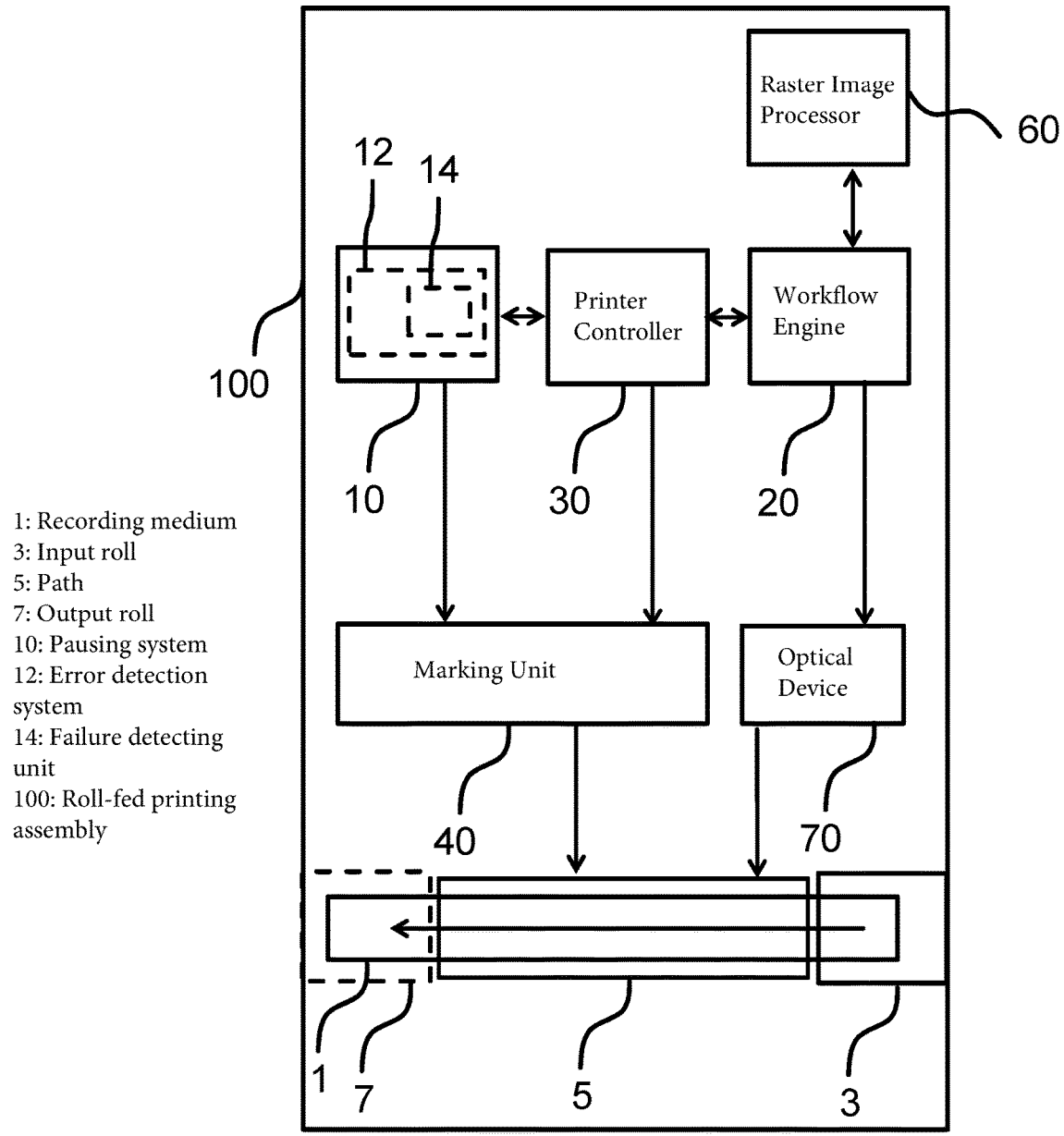
FIG. 1 schematically shows a roll-fed printing assembly according to an embodiment of the third aspect.

The present invention will now be described with reference to the accompanying drawings, wherein the same reference numerals have been used to identify the same or similar elements throughout the several views, and in some instances throughout the several embodiments.

FIG. 1 schematically shows a roll-fed printing assembly 100 according to an embodiment. For the following detailed description, reference will also be made to depictions and reference signs in the following FIG. 2 and FIG. 3 which may better illustrate the function of the roll-fed printing assembly 100. In addition, reference will be made occasionally to FIG. 4.

Figure 4:
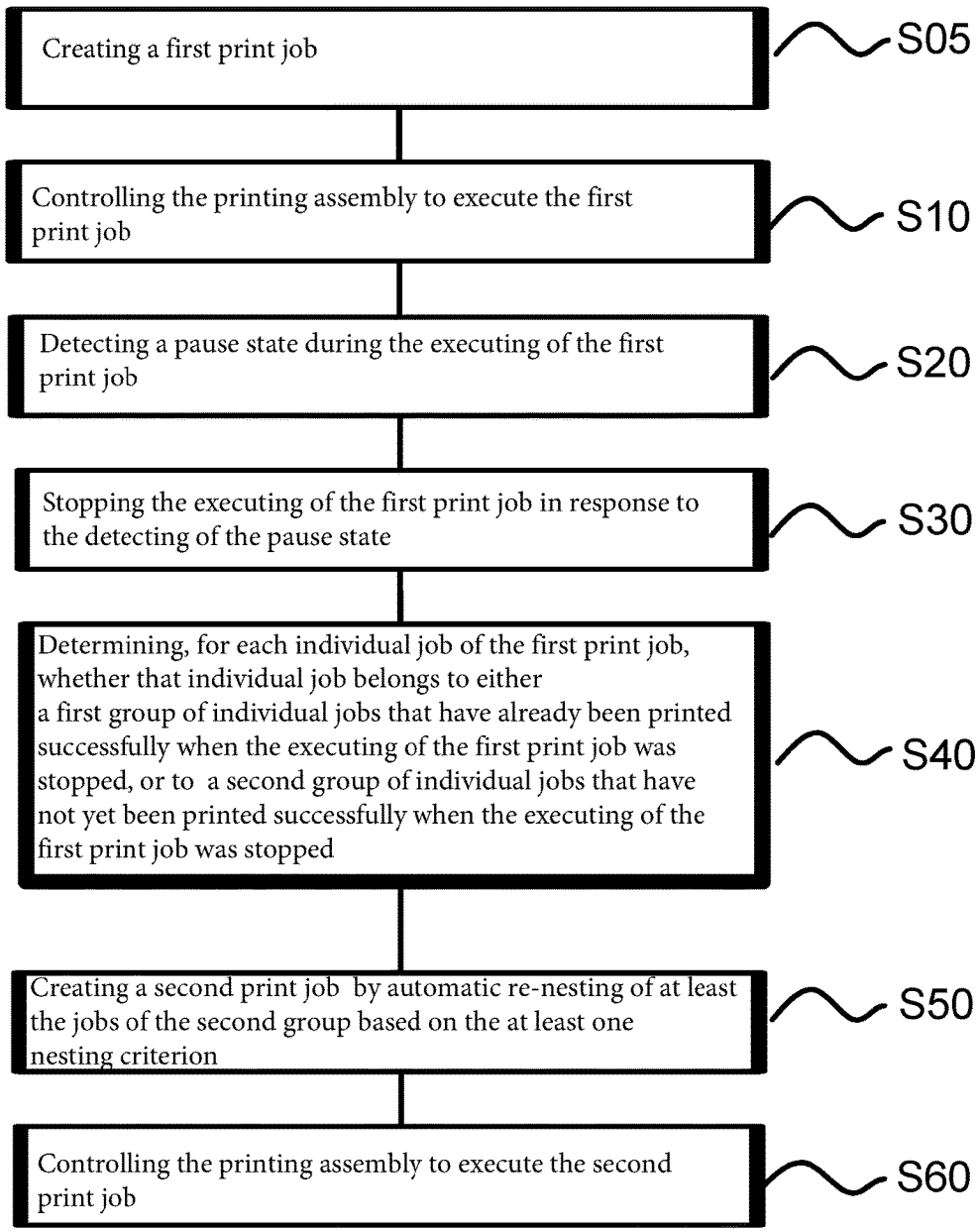
FIG. 4 shows a schematic flow diagram illustrating a method according to an embodiment of the first aspect.

FIG. 4 shows a schematic flow diagram illustrating a method for controlling a roll-fed printing assembly 100 for printing images on a recording medium 1.

In the roll-fed printing assembly 100, recording medium 1 is initially wound up on an input roll 3 and is therefrom guided, by and by, along a path 5 of the roll-fed printing assembly 100. If the roll-fed printing assembly 100 is, specifically, a roll-to-roll inkjet printing assembly, then the roll-to-roll inkjet printing assembly may additionally comprise an output roll 7 onto which the recording medium 1 is wound, by and by, after it has been marked according to a print job. The path 5 comprises actors and other components to move, and guide, the recording medium 1 along.

The roll-fed printing assembly 100 comprises a marking unit 40 configured to mark the recording medium 1, using a marking material, in accordance with print jobs. A large number of individual jobs to be printed may be submitted to the roll-fed printing assembly 100. In order to print more efficiently and to save resources, these individual jobs may be nested, by a workflow engine 20 of the roll-fed printing assembly 100, to create one large print job which will, in the following, be called a first print job PJ1.

For creating the first print job PJ1, at least one nesting criterion is applied. The at least one nesting criterion may comprise a criterion that the first print job shall be created such that as many of the individual jobs of the first print job PJ1 are able to be printed before a specific resource of, or available to, the roll-fed printing assembly 100 is depleted to a certain amount or percentage. The percentage may, for example, be zero percent.

The percentage may alternatively be set to a larger percentage than zero, for example, 5% (five percent). In that way, possible errors in the determination, or prediction, of the remaining amount of that resource are taken into account and it is made sure that the last individual jobs printed are actually printed while the specific resource is still undepleted. For example, it may be undesirable to print until ink is depleted down to zero percent as, at very low ink levels, the printing results and/or the reliability of an ink level estimation may vary.

In the case that more than one nesting criteria are applied, the percentages for all of the criteria may be the same, e.g. zero. There may also be a different percentage set for each, or for a number of, the applied nesting criteria.

The specific resource may be at least one of time, marking material, and the recording medium 1. For roll-fed or roll-to-roll inkjet printing assembly, for example, the specific resource may be at least one of time, ink, and remaining recording medium upstream of a print head of the inkjet printing assembly.

If the applied nesting criterion concerns only time as the specific resource, then the individual jobs may be nested such in the first print job PJ1 by the workflow engine 20 that as many individual jobs as possible are printed as soon as possible when the first print job PJ1 is executed. The individual jobs may be nested within first print job PJ1 in order by ascending time consumption.

If the applied nesting criterion concerns only marking material (e.g. ink) as the specific resource, then the individual jobs are nested such in the first print job PJ1 by the workflow engine 20 that as many individual jobs as possible are printed, given the remaining amount of marking material. The individual jobs may be nested within the first print job PJ1 in order by ascending marking material consumption.

If the applied nesting criterion concerns only medium 1 as the specific resource, then the individual jobs may be nested such within first print job PJ1 by the workflow engine 20 that the remaining recording medium 1 is covered as much as possible by the individual jobs.

The at least one nesting criterion may be a plurality of nesting criteria, each provided with a unique priority number or a priority weight. For example, the plurality of nesting criteria may comprise a plurality of specific resources whose consumption is to be minimized when creating the first print job PJ1, wherein each specific resource is provided with a priority weight.

As an example, the plurality of nesting criteria may comprise "recording medium" with an 80% weight and "marking material" with a 20% weight, or, in other words, saving recording medium is four times as important as saving marking material. When two different possible nesting arrangements are compared, one of the two arrangements might be preferred over the other when it offers a 10% recording medium saving, even when the other arrangement offers saving of marking material of up to (less than) 40%.

Accordingly, with reference to FIG. 4, the method of FIG. 4 may comprise a step S05 in which the first print job PJ1 is created as described herein with respect to the operation of the workflow engine 20.

The roll-fed printing assembly 100 comprises a raster image processor 60 (or "RIP" for short) for rasterizing the original data of a first print job PJ1 created by the workflow engine 20 into a format suitable for the printer, e.g. one or more bitmaps. A printer controller 30 of the roll-fed printing assembly 100 is configured to control the roll-fed printing assembly 100, as will be described in more detail in the following.

If the roll-fed printing assembly 100 is formed as a single roll-fed printing apparatus, the raster image processor 60 may be part of that apparatus, i.e. the raster image processor may be contained in the same housing as e.g. the marking unit. However, in an (at least partially) distributed roll-fed printing assembly 100, the raster image processor may be situated outside of such a housing.

With reference to FIG. 4, the method of FIG. 4 comprises a step S10 of controlling the printing assembly 100 to execute the first print job PJ1 as described with respect to the printer controller 30 and the workflow engine 20.

The workflow engine 20, the RIP 60, the printer controller 30 and/or other components of the roll-fed printing assembly 100 described herein may be realized as hardware components, as software components, or as a combination of hardware and software components. Although many of the components of the roll-fed printing assembly 100 are described herein as separate entities, it should be understood that several of them might be integrated with one another or may be implemented as software modules running on the same hardware. For example, the workflow engine 20, the RIP 60 and the printer controller 30 may be implemented as software modules run stored on a memory and executed by a processor of the roll-fed printing assembly 100.

Figure 2:
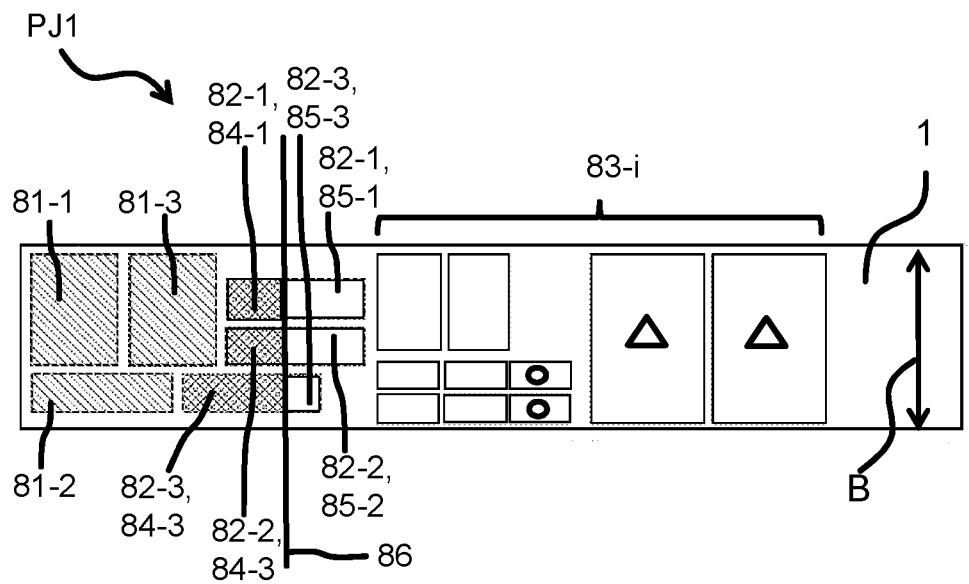
FIG. 2 schematically shows a view of a recording medium for illustrating the function of the roll-fed printing assembly of FIG. 1 as well as the method of FIG. 4.

In FIG. 2, a schematic view of a recording medium 1 during the executing of the first print job PJ1 is shown. Specifically, the executing of an exemplary first print job PJ1 with sixteen individual jobs is illustrated. This number is only chosen as an example; it should be understood that the first print job PJ1 may contain less, or more, individual jobs. The first print job PJ1 of FIG. 2 comprises three individual jobs designated as 81-1, 81-2, 81-3 (or, collectively, as 81-i), three individual jobs designated as 82-1, 82-2, 82-3 (or, collectively, as 82-i), and ten individual jobs collective designated as 83-i, of which two are marked with triangles and two with circles for the following explanation. The right-most area of the recording medium 1 in FIG. 2 is left empty to symbolize that additional individual jobs might be comprised by the first print job PJ1.

It is also evident from FIG. 2 that the individual jobs 81-*i* through 83-*i* are nested in that they are arranged not only side-by-side along the length of the recording medium 1 (from left to right in FIG. 2) along which the recording medium 1 is moved during the executing of the first print job PJ1, but also arranged side-by-side along the breadth B of the recording medium 1 perpendicular to the length of the recording medium 1.

Note that FIG. 2 shows the intended arrangement of the individual jobs 81-*i* through 83-*i* on the recording medium 1 for the case that there are no error or interruptions and that the first print job PJ1 is carried out as originally intended.

The roll-fed printing assembly 100 further comprises a pausing system 10 configured to detect a pause state during executing of the first print job PJ1 by the roll-fed printing assembly 100. As has already been described in the foregoing, the pause state may be a state in which an operator, or a hardware or software device, has issued an order to pause, or stop, the executing of the first print job PJ1. The pause state may also be an error state in which an error has occurred in any part of the printing process, or in the operation of the roll-fed printing assembly 100.

For example, an operator may visually inspect the executing of the first print job PJ1, and may realize that e.g. a mistake has been made in a parameter setting of the roll-fed printing assembly 100 or in the submission of the individual jobs. The operator may then activate a hold/pause input unit of the roll-fed printing assembly 100, for example a hold/pause button, switch, touch screen, or lever. As a result of the activating of the hold/pause input unit, a stopping of the executing of the first print job PJ1 may be automatically scheduled by the pausing system 10, or a stopping of the executing of the first print job PJ1 may immediately be effected by the pausing system 10.

As another example, the error state may result from an automatic determination that a resource, e.g. marking material, has run out, or is predicted to run out before the executing of the first print job PJ1 is complete. This may be the case, e.g., when unexpected additional maintenance actions were performed that consumed marking material (such as ink).

It may also be provided that, as a result of the activating of the hold/pause input unit, first a pause of the executing of the first print job PJ1 is caused, during which the operator may decide, by activating corresponding input units of the roll-fed printing assembly 100, whether the executing of the first print job PJ1 should be resumed, or whether the executing should be stopped. The different input units described above and in the following may be part of a user interface (UI) of the roll-fed printing assembly 100 which may, e.g., be implemented by a touch screen.

Alternatively, or additionally, the pausing system 10 may comprise, or consist of, an optional error detection system 12 configured to automatically detect an error in the executing of the first print job PJ1, or in the operation of the roll-fed printing assembly 100 as a whole. Upon automatically detecting such an error, the error detecting system 12 may generate an error signal indicating the error and/or may be configured to immediately effect the stopping of the executing of the first print job PJ1.

As an example, the error detection system 12 may comprise, or make use of, an optical device 70, preferably an inline optical device, arranged and configured for optically inspecting at least a section of the recording medium 1. That section may, but does not have to be, arranged downstream of the marking unit 40 of the printing assembly 100 (e.g. downstream of a print head of a roll-to-roll inkjet printing assembly). For example, the error detection system 12 and the optical device 70 may be arranged to scan the printed sections of the recording medium 1 for anomalies such as color loss, damage of the recording medium 1 and so on. Optical device 70 may be implemented as a camera or at least one captor and/or sensor. The camera may, e.g., be of the type RGB or RGB-D.

The error detection system 12 may be configured to compare the scan images taken from the optical device 70 and to compare them to corresponding sections of the bitmap representing the first print job PJ1 in order to determine if what has actually been printed on the recording medium 1 is what, according to the bitmap, should have been printed.

As an alternative, or in addition, the error detection system 12 may comprise at least one failure detecting unit 14 configured to detect a mechanical failure of a component of the printing assembly. The failure detecting unit 14 is preferably further configured to create an error signal indicating, as the pause state, an error state as a result of the mechanical failure. For example, the failure detecting unit 14 may be part of an automatic nozzle failure detection system e.g. of an inkjet printing assembly, i.e. the failure detecting unit 12 may be configured for detecting a mechanical failure of a nozzle of a print head of the inkjet printing assembly.

Accordingly, the method of FIG. 4 may comprise a step S20 of detecting a pause state during the executing of the first print job PJ1 as described herein with respect to the pausing system 10, preferably as described with respect to the UI, the error detection system 12 and/or the failure detecting unit 14.

The method of FIG. 4 comprises a step S30 in which, as a result of, i.e. in response to, the detecting S20 of the pause state, the executing of the first print job PJ1 is stopped. The step S30 may be executed as described herein with reference to the pausing system 10, e.g. in response to an error signal or in response to a user giving, via the UI, a stop command.

After the stopping of the executing of the first print job PJ1, some of the individual jobs may have been printed successfully, and other individual jobs may not have been printed successfully.

The workflow engine 20 is configured to determine, after the stopping of the executing of the first print job PJ1, for each job 81-*i*, 82-*i*, 83-*i* of the batch of nested individual jobs of the first print job PJ1, whether that individual job 81-*i*, 82-*i*, 83-*i* belongs to either:
- a first group of individual jobs that have already been printed successfully when the executing of the first print job was stopped,
- or to
- a second group of individual jobs that have not yet been printed successfully when the executing of the first print job was stopped.

Accordingly, the method of FIG. 4 comprises a step S40 of determining, after the stopping of the executing of the first print job PJ1, for each job 81-*i*, 82-*i*, 83-*i* of the batch of nested individual jobs of the first print job PJ1, whether that individual job 81-*i*, 82-*i*, 83-*i* belongs to either:
- a first group of individual jobs that have already been printed successfully when the executing of the first print job was stopped,
- or to
- a second group of individual jobs that have not yet been printed successfully when the executing of the first print job was stopped.

The step S40 may be performed according to any of the variants or modification described hereinbefore or hereafter with respect to the workflow engine 20.

In the following, for the sake of simplicity, the embodiment of FIG. 1 will be described under the premise that the criterion for successful printing is that the individual job has been printed completely. However, as has been discussed in the foregoing, a number of different criteria for successful printing may be applied instead, or in addition, both with the embodiment of FIG. 1 as well as with the embodiment of FIG. 4.

In FIG. 2, a vertical line symbolizes a stopping position 86 within the first print job PJ1. Regarding the following discussion, it is assumed that the stopping position 86 is located at a position in the bitmap representing the first print job PJ1 which corresponds to a location along the length of the recording medium 1 at which the marking unit 40 is arranged to mark the recording medium 1 at the time of the stopping of the executing of the first print job PJ1. For example, the marking unit 40 may be a print head moving along the breadth B of the recording medium 1 in reciprocation along a scanning direction. The elements, functions and ideas described are, however, equally applicable in e.g. the case that the stopping position 86 has become different from the position of the marking unit 40, for example, because the recording medium 1 has been transported a little further (or back) after the stopping of the first print job PJ1.

All parts of the individual jobs that are positioned to the left (i.e. downstream) of the stopping position 86 (these parts are shown as hatched in FIG. 2) have been printed; all parts of the individual jobs that are positioned to the right (i.e. upstream) of the stopping position 86 (these parts are shown as un-hatched rectangles in FIG. 2) have not yet been printed. The terms "downstream" and "upstream" are used here with respect to the first print job PJ1 (instead of with respect to the recording medium 1) in the sense that an upstream direction can be designated for the bitmap representing the first print job PJ1 as the direction that would be upstream for the recording medium 1 were the first print job PJ1 printed on the recording medium 1, and equally for the downstream direction.

It is evident from FIG. 2 that the individual jobs 81-1, 81-2 and 81-3 (collectively: 81-$i$) have been completely printed. Accordingly, the individual jobs 81-$i$ are determined, by the workflow engine 20, to belong to the first group.

The individual jobs 83-$i$ have not yet been printed even partially. Accordingly, the individual jobs 83-$i$ are determined, by the workflow engine 20, to belong to the second group.

The individual jobs 82-1, 82-2, 82-3 (collectively: 82-$i$) are intersected by the stopping position 86 such that each consists of a portion 84-1, 84-2, 84-3, respectively, that has already been printed, and a portion 85-1, 85-2, 85-3, respectively, that has not yet been printed. Accordingly, each of the individual jobs 82-$i$ has not been printed completely (only partially) and is therefore determined, by the workflow engine 20, to belong to the second group.

The determining which individual jobs have been successfully printed and which have not, may be performed according to one of several options.

As one example, the workflow engine 20 may be configured to determine the stopping position 86 in a bitmap representing the first print job PJ1, at which the executing of the first print job PJ1 was stopped, and to identify which of the jobs of the first print job PJ1 were not completely comprised in the section of the bitmap preceding the determined stopping position 86 (i.e. left of the stopping position 86 in FIG. 2). One reliable option is to, simultaneously during the executing of the first print job PJ1 and the according movement of the recording medium 1, track a current printing position along the bitmap representing the first print job PJ1, and to set that tracked position at the time of the stopping of the executing of the first print job PJ1 as the stopping position 86.

Another option is to use an optional optical device 70 configured for optically inspecting at least a section of the recording medium 1 downstream of the marking unit 40, e.g. as has been described in the foregoing with respect to the pausing system 10. Said optical device 70 may be configured to compare a scanned image of the section of the recording medium 1 to a bitmap of the first print job PJ1 and to determine a position of the bitmap data representing that scanned image within the bitmap of the first print job PJ1. Using a known distance along the recording medium 1 between a position of the scanned image on the recording medium 1 and a position of the marking unit 40, and translating that distance into a distance on the bitmap starting at the—still unknown—stopping position 86 and ending at the known position of the bitmap data representing the scanned image, the stopping position 86 in the bitmap may be determined.

The determining whether each individual job of the first print job PJ1 belongs to the first group or to the second group may alternatively also be performed using given predetermined cut path data comprising information about at least one cut path along which the recording medium is to be cut in order to separate the nested individual jobs of the first print job after their printing.

The predetermined cut path data contain reliable information about where boundaries between the individual jobs are arranged on the recording medium 1, since cutting units for cutting the recording medium must be able to cut the recording medium such that the individual jobs are separated. Accordingly, a current position of the marking unit 40 (e.g. a print head of an inkjet printing assembly) with respect to the recording medium 1 may be compared with the cut paths. When a cut path is intersected by the line along which the marking unit is arranged to print the image at the time of the stopping of the executing of the first print job, it may, as a result, be determined that all individual jobs that lie on the upstream side of that cut path belong to the second group.

The workflow engine 20 is further configured to create a second print job PJ2 by automatic re-nesting of at least the jobs of the second group 82-$i$, 83-$i$ based on at least one nesting criterion. The at least one nesting criterion may be the same nesting criterion (or the same group of nesting criteria) as applied for the creating S10 of the first print job PJ1, or it (or they) might be—completely or partially—different criteria. For example, a user input into the UI after the first print job PJ1 has started might control the roll-fed printing assembly 100, in particular the workflow engine 20, to change priorities, i.e. to modify the applied nesting criterion or nesting criteria.

Accordingly, the method of FIG. 4 comprises a step S50 of creating the second print job PJ2 by automatic re-nesting of at least the jobs of the second group based on the at least one nesting criterion for the second print job PJ2.

The creating S50 of the second print job PJ2 by the workflow engine 20 may be further based on a current state of the roll-fed printing assembly 100 such as a current remaining amount of marking material.

For example, because of the partial and therefore unsuccessful printing of a large individual job, such a large amount of ink (e.g. of a certain type such as red color ink) may have been used in an inkjet printing assembly that the original first print job PJ1 could no longer be printed completely. The second print job PJ2 may then be created by the workflow engine 20 such that as many individual jobs as possible are printed before that ink (e.g. red color ink) runs out completely. For instance, a lot of, or all, individual jobs that do not require that ink (i.e. that do not require red color ink) may be moved to the front of the second print job PJ2.

The nesting of the second print job PJ2 is further described with reference to FIG. 3. As is evident from FIG. 3, the individual jobs 82-*i* which had previously only partially been printed are now re-nested in the second print job PJ2 as individual jobs 82'-1, 82'-2, 82'-3 (collectively: 82'-*i*). Due to the new arrangement of the individual jobs 82'-*i* according to the at least one nesting criterion as parallel and flush with each other, a gap has "opened" in the bitmap so that the two individual jobs marked with circles could be put, again in accordance with the applied at least one nesting criterion, slightly downstream of their previous positions during the re-nesting. As a result of the gap "opening" at the previous position of the individual jobs marked with a circle, the two individual jobs marked with triangles could advantageously also be moved downstream of their previous positions during re-nesting when creating the second print job PJ2.

Figure 3:
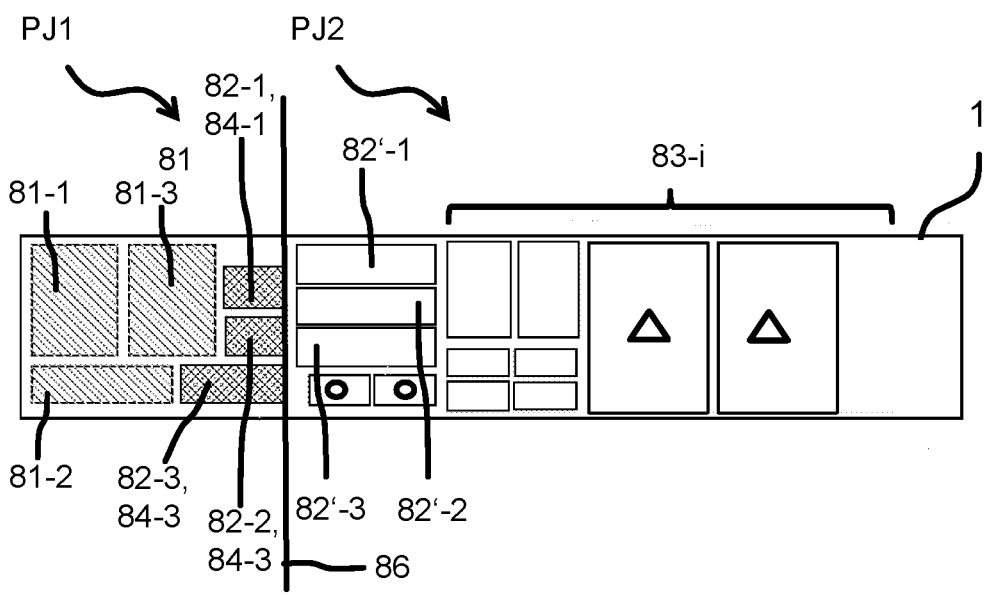
FIG. 3 schematically shows a view of a recording medium for illustrating the function of the roll-fed printing assembly of FIG. 1 as well as the method of FIG. 4.

As is evident from a comparison of FIG. 3 with FIG. 2, almost no recording medium 1 has been lost despite the occurrence of the pause state and the botching of the individual jobs 82-*i*.

By contrast, in the previously known art, the individual jobs 82-*i* and 83-*i* would simply have been included again in the re-started, one and only original (first) print job PJ1 in the same relative position to each other and to the breadth B of the recording medium 1.

The second print job PJ2 may consist only of the individual jobs of the second group. Alternatively, it may be possible to add to the second print job PJ2 also additional individual jobs that have so far not been part of the first print job PJ1 but which have been transmitted to the workflow engine 20 after the creating of the first PJ1. In this way, the pause state may be utilized to add additional individual jobs and to create the second PJ2 also taking these additional individual jobs into account when evaluating the at least one nesting criterion.

The printer controller 30 is configured to control the roll-fed printing assembly 100 to execute the second print job PJ2 after its creating. The creating of the second print job PJ2 will comprise controlling, by the workflow engine 20, the RIP 60 to rasterize the second print job PJ2 into a new bitmap. That new bitmap may then be, via the printer controller 30, transferred to the marking unit 40 which may then be, by the printer controller 30, controller to mark the recording medium 1 according to that new bitmap.

Accordingly, the method of FIG. 4 may comprise a step S60 of controlling the printing assembly 100 to execute the second print job PJ2. The step S60 may comprise a step of controlling the RIP 60 to rasterize the second print job PJ2 into the new bitmap and to transfer that new bitmap to the marking unit 40 for marking the recording medium 1 according to that new bitmap. Alternatively, the step S60 may be designated as executing the second print job PJ2. Moreover, other devices than the roll-fed printing assembly 100 may be controlled based on the second print job PJ2.

The workflow engine 20 may further be configured to control a component of the printing assembly 100 arranged downstream of the marking unit 40 of the printing assembly 100 in accordance with the second print job. This "updating" of further components is an advantage of the workflow engine 20 creating the second print job PJ2 as the workflow engine 20 often controls, at least to some degree, operations downstream of the marking unit 40.

The controlled component may, e.g., by a cutting unit configured to cut the recording medium 1 according to given cut paths. That controlled component may e.g. also be the optical device 70, and the controlling S60 may comprise updating the bitmap that the optical device 70 uses to carry out the functions described above.

According to an embodiment the UI is configured to show a representative image of the recording medium 1 and on the representative image exactly where the printer stopped printing and an image of a print job in the UI which is interrupted while printed. The image is movable to another location on the representative image of the recording medium 1. The operator may plan the image to be printed on a more desirable location on the recording medium 1 by dragging the image to the more desirable location on the representative image of the recording medium 1. Once the desired location is found the operator may press a continue button and the printing assembly 100 continues printing from the newly set location.

Figure 5:
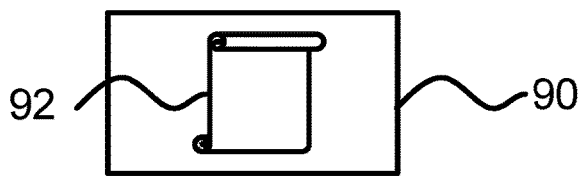
FIG. 5 schematically shows a software medium according to an embodiment of the second aspect.

FIG. 5 schematically shows a non-transitory software medium 90 according to an embodiment of the second aspect. The software medium 90 comprises executable code 92 configured to, when executed, perform the method of the first aspect, e.g. as described with respect to either the roll-fed printing assembly 100 or the method of controlling the roll-fed printing assembly 100, according to any or all of the FIGS. 1 to 4 and/or according to any of the variants and modifications of the roll-fed printing assembly 100 and/or of the method described herein.

The software medium may, specifically, be formed as a CD or a CD-ROM, a DVD or a DVD-ROM, a BluRay disc or a BluRay-ROM disc, a magnetic hard drive, a solid state disk (SSD) hard drive, a USB memory device and so on.

While detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

It will be evident that the described embodiments may be varied in many ways. All such modifications as would be evident to one skilled in the art starting from what is explicitly described are intended to be included.

The invention claimed is:

1. A method for controlling a roll-fed printing assembly for printing images on a recording medium, the method comprising the steps of:

controlling the printing assembly to execute a first print job containing a batch of nested individual jobs, the first print job being raster image processed into one bitmap;

detecting a pause state during the executing of the first print job;

stopping the executing of the first print job in response to the detecting of the pause state;

determining, for each individual job of the first print job, whether that individual job belongs to either:

a first group of individual jobs that have already been printed successfully when the executing of the first print job was stopped, or to a second group of individual jobs that have not yet been printed successfully when the executing of the first print job was stopped;

creating a second print job by automatic re-nesting of at least the jobs of the second group based on at least one nesting criterion;

raster image processing the second print job into one new bitmap; and controlling the printing assembly to execute the second print job, wherein the determining whether each job of the first print job belongs to the first group or to the second group is performed by:

determining at which stopping position, of the one bitmap representing the first print job, the executing of the first print job was stopped;

identifying which of the jobs of the first print job were not completely comprised in the printed section of the one bitmap preceding the determined stopping position; and determining these identified jobs as belonging to the second group and the remaining jobs of the first print job as belonging to the first group.

2. The method of claim 1, wherein the stopping position is determined based on an automated optical inspection of at least a section of the recording medium downstream of a marking unit of the printing assembly.

3. The method of claim 1, wherein the determining whether each individual job of the first print job belongs to the first group or to the second group is performed using given predetermined cut path data comprising information about at least one cut path along which the recording medium is to be cut in order to separate the nested individual jobs of the first print job after their printing.

4. The method of claim 1, wherein the at least one nesting criterion comprises a criterion that the second print job shall be created such that as many of the individual jobs of the second print job are able to be printed before a specific resource is depleted to a certain amount or percentage.

5. The method of claim 4, wherein the specific resource is at least one of time, ink, and the recording medium upstream of a marking unit of the printing assembly.

6. The method of claim 1, comprising controlling a component of the printing assembly arranged downstream of a marking unit of the printing assembly in accordance with the second print job.

7. The method of claim 1, wherein the pause state is an error state detected based on an automated optical inspection of at least a section of the recording medium downstream of a marking unit of the printing assembly.

8. The method of claim 1, wherein the pause state is an error state detected based on a monitoring of at least one component of the printing assembly for mechanical failures.

9. A non-transitory software medium comprising executable code configured to, when executed, perform the method according to claim 1.

10. A roll-fed printing assembly for printing images on a recording medium, comprising:

a pausing system configured to detect a pause state during executing of a first print job containing a batch of nested individual jobs, the first print job being raster image processed into one bitmap;

the pausing system being further configured to stop the executing of the first print job in response to the detecting of the pause state;

a workflow engine configured to determine, for each job of the batch of nested individual jobs, whether that individual job belongs to either:

a first group of individual jobs that have already been printed successfully when the executing of the first print job was stopped, or to a second group of individual jobs that have not yet been printed successfully when the executing of the first print job was stopped;

the workflow engine further configured to create a second print job by automatic re-nesting of at least the jobs of the second group based on at least one nesting criterion, the second print job being raster image processed into one bitmap; and a printer controller configured to control the printing assembly to execute the second print job, wherein the workflow engine is configured to determine whether each job of the first print job belongs to the first group or to the second group is performed by:

determining at which stopping position, of the one bitmap representing the first print job, the executing of the first print job was stopped;

identifying which of the jobs of the first print job were not completely comprised in the printed section of the one bitmap preceding the determined stopping position; and determining these identified jobs as belonging to the second group and the remaining jobs of the first print job as belonging to the first group.

11. The printing assembly of claim 10, wherein the workflow engine is configured such that the at least one nesting criterion comprises a criterion that the second print job shall be created such that as many of the individual jobs of the second print job are able to be printed by the printing assembly before a specific resource is depleted to a certain amount or percentage.

12. The printing assembly of claim 10, comprising an optical device arranged and configured for optically inspecting at least a section of the recording medium;

wherein the optical device is further configured to create an error signal indicating, as the pause state, an error state based on the optical inspecting;

and/or wherein the optical device is further configured to create a position signal indicating a stopping position, or stopping percentage, of a bitmap representing the first print job, at which the executing of the first job has been stopped.

13. The printing assembly according to claim 10, comprising at least one failure detecting unit configured to detect a mechanical failure of a component of the printing assembly;

wherein the failure detecting unit is further configured to create an error signal indicating, as the pause state, an error state as a result of the mechanical failure.

14. The printing assembly according to claim 13, wherein the printing assembly is an inkjet printing assembly;

wherein the marking unit is a print head; and wherein the failure detecting unit is configured for detecting a mechanical failure of a nozzle of the print head of the inkjet printing assembly.

15. A roll-fed printing assembly for printing images on a recording medium, comprising:

a pausing system configured to detect a pause state during executing of a first print job containing a batch of nested individual jobs, the first print job being raster image processed into one bitmap;

the pausing system being further configured to stop the executing of the first print job in response to the detecting of the pause state;

a workflow engine configured to determine, for each job of the batch of nested individual jobs, whether that individual job belongs to either:

a first group of individual jobs that have already been printed successfully when the executing of the first print job was stopped, or to a second group of individual jobs that have not yet been printed successfully when the executing of the first print job was stopped;

the workflow engine further configured to create a second print job, the second print job being raster image processed into one bitmap; and a printer controller configured to control the printing assembly to execute the second print job, wherein the workflow engine is configured to determine whether each job of the first print job belongs to the first group or to the second group is performed by:

determining at which stopping position, of the one bitmap representing the first print job, the executing of the first print job was stopped;

identifying which of the jobs of the first print job were not completely comprised in the printed section of the one bitmap preceding the determined stopping position; and determining these identified jobs as belonging to the second group and the remaining jobs of the first print job as belonging to the first group, and wherein the roll-fed printing assembly further comprises a user interface which is configured to show a representative image of the recording medium and to show on the representative image the stopping position on the recording medium and an image of a print job which is interrupted while printed, and to move the image to another desired location on the recording medium by means of the representative image of the recording medium, and wherein the print job which is interrupted while printed being a job of the second group.

* * * * *